(12) United States Patent
Emery et al.

(10) Patent No.: US 7,398,138 B2
(45) Date of Patent: Jul. 8, 2008

(54) SWIMMING POOL AND SPA CONTROLLER SYSTEMS AND EQUIPMENT

(75) Inventors: Kevin Emery, La Mesa, CA (US); Thomas M. Nornberg, San Diego, CA (US); Dave Peterson, San Diego, CA (US); Ken Peterson, Temecula, CA (US); Dan Kellogg, Murrieta, CA (US); Han Le, San Diego, CA (US); John Bent, Carlsbad, CA (US); John Gjata, Encinitas, CA (US)

(73) Assignee: Zodiac Pool Care, Inc., Vista, CA (US)

( * ) Notice: Subject to any disclaimer, the term of this patent is extended or adjusted under 35 U.S.C. 154(b) by 0 days.

(21) Appl. No.: 11/271,205

(22) Filed: Nov. 10, 2005

(65) Prior Publication Data
US 2007/0106403 A1    May 10, 2007

(51) Int. Cl.
*G06F 17/00* (2006.01)
*G05D 7/00* (2006.01)
*G05D 11/00* (2006.01)

(52) U.S. Cl. .................. 700/283; 700/90; 700/282
(58) Field of Classification Search .................. 700/90, 700/275, 282, 283
See application file for complete search history.

(56) References Cited

U.S. PATENT DOCUMENTS

| | | | |
|---|---|---|---|
| 5,019,250 A | 5/1991 | Lorenzen | |
| 6,309,538 B1 | 10/2001 | Khan | |
| 6,419,840 B1 * | 7/2002 | Meincke | 210/767 |
| 6,592,752 B2 * | 7/2003 | Mathews | 210/97 |
| 7,243,379 B2 * | 7/2007 | Panopoulos | 4/490 |
| 2002/0033364 A1 * | 3/2002 | Hammonds | 210/198.1 |
| 2003/0034284 A1 | 2/2003 | Wolfe | |

FOREIGN PATENT DOCUMENTS

| | | |
|---|---|---|
| EP | 1 528 185 A2 | 5/2005 |
| EP | 1 528 185 A3 | 5/2005 |
| WO | WO 03/066999 A1 | 8/2003 |

OTHER PUBLICATIONS

Invitation to Pay Additional Fees and Partial Search Report issued Apr. 24, 2007 in related Application No. PCT/US2006/043190.

* cited by examiner

*Primary Examiner*—Ryan A Jarrett
(74) *Attorney, Agent, or Firm*—Dean W. Russell; Kilpatrick Stockton LLP (57) ABSTRACT

Systems for controlling aspects of recreational or other environments are described. Such systems are especially, but not exclusively, useful for controlling either or both of pool or spa settings and operations and include equipment that may be connected, in any appropriate way, to personal or other computers or other components capable of accepting and processing input. Operations of the systems additionally are capable of being simulated through software.

6 Claims, 5 Drawing Sheets

| HIGH POWER DEVICES HP1 – HP8 or HP9 – HP16 | LOW POWER DEVICES LP1 – LP6 | VALVES VLV1 – VLV6 | SENSORS SEN1 – SEN6 |
|---|---|---|---|
| Waterfall | Landscape Lighting | User Defined... | Air Temperature |
| Water Feature | User Defined... |  | Other Temperature |
| Fiber Optic Light Driver (M) |  |  | User Defined... |
| Fiber Optic Color Wheel (M) |  |  |  |
| Lights |  |  |  |
| User Defined... |  |  |  |
|  |  |  |  |

Fig. 3

| HIGH POWER DEVICES HP1 – HP8 or HP9 – HP16 | LOW POWER DEVICES LP1 – LP6 | VALVES VLV1 – VLV6 | SENSORS SEN1 – SEN6 |
|---|---|---|---|
| Pool/Spa Circulation Pump (M) | Pool/Spa Heater (M) | Pool/Spa Solar Valve (M) | Pool/Spa Temperature (M) |
| Pool/Spa Circulation Pump Low Speed (M) | Pool Heater (M) | Pool Solar Valve (M) | Pool Temperature (M) |
| Pool/Spa Heater (M) | Spa Heater (M) | Cleaner Valve (M) | Spa Temperature (M) |
| Pool Heater (M) | Pool/Spa Heat Pump (M) | Suction Valve (M) | Solar Temperature (M) |
| Spa Heater (M) | Pool Heat Pump (M) | Return Valve (M) | Filter Pressure (M) |
| Pool/Spa Heat Pump (M) | Spa Heat Pump (M) | Spa Dependent Valve (M) | |
| Pool Heat Pump (M) | Pool Chiller | Backwash Supply Valve (M) | |
| Spa Heat Pump (M) | | Backwash Rain | |
| Pool/Spa Solar Pump (M) | | Water Feature Valve | |
| Pool Solar Pump (M) | | Waterfall Valve | |
| Cleaner Pump (M) | | In-Floor Cleaning Valve (M) | |
| Spa Jet Pump | | | |
| Pool/Spa Light | | | |
| Pool Light | | | |
| Spa Light | | | |
| Blower | | | |
| Pool Chiller | | | |

Fig. 4

| HIGH POWER DEVICES HP1 – HP8 or HP9 – HP16 | LOW POWER DEVICES LP1 – LP6 | VALVES VLV1 – VLV6 | SENSORS SEN1 – SEN6 |
|---|---|---|---|
| Pool Circulation Pump (M) | Pool Heater (M) | Pool Solar Valve (M) | Pool Temperature (M) |
| Pool Circulation Pump Low Speed (M) | Pool Heat Pump (M) | Cleaner Valve (M) | Solar Temperature (M) |
| Pool Heater (M) | Pool Chiller | Backwash Supply Valve (M) | Filter Pressure (M) |
| Pool Heat Pump (M) | | Backwash Return Valve (M) | |
| Pool Solar Pump (M) | | Water Feature Valve | |
| Cleaner Pump (M) | | Waterfall Valve | |
| Pool Light | | In-Floor Cleaning Valve (M) | |
| Pool Chiller | | | |

Fig. 5

| HIGH POWER DEVICES HP1 – HP8 or | LOW POWER DEVICES LP1 – LP6 | VALVES VLV1 – VLV6 | SENSORS SEN1 – SEN6 |
|---|---|---|---|
| HP9 – HP16 | | | |
| Spa Circulation Pump (M) | Spa Heater (M) | Backwash Supply Valve (M) | Spa Temperature (M) |
| Spa Circulation Pump Low Speed (M) | Spa Heat Pump (M) | Backwash Return Valve (M) | Filter Pressure (M) |
| Spa Heater (M) | | Water Feature Valve | |
| Spa Heat Pump (M) | | Waterfall Valve | |
| Spa Jet Pump | | | |
| Spa Light | | | |
| Blower | | | |

Fig. 6

| HIGH POWER DEVICES HP1 – HP8 or HP9 – HP16 | LOW POWER DEVICES LP1 – LP6 | VALVES VLV1 – VLV6 | SENSORS SEN1 – SEN6 |
|---|---|---|---|
| High-Speed Pool Circulation Pump (M) | Pool Heater (M) | Pool Solar Valve (M) | Pool Temperature (M) |
| Low-Speed Pool Circulation Pump (M) | Spa Heater (M) | Cleaner Valve (M) | Spa Temperature (M) |
| High-Speed Spa Circulation Pump (M) | Pool Heat Pump (M) | Backwash Supply Valve (M) | Solar Temperature (M) |
| Low-Speed Spa Circulation Pump (M) | Spa Heat Pump (M) | Backwash Return Valve (M) | Filter Pressure (M) |
| Pool Heater (M) | | Water Feature Valve | |
| Spa Heater (M) | | Waterfall Valve | |
| Pool Heat Pump (M) | | In-Floor Cleaning Valve (M) | |
| Spa Heat Pump (M) | | | |
| Pool Solar Pump (M) | | | |
| Cleaner Pump (M) | | | |
| Spa Jet Pump | | | |
| Pool Light | | | |
| Spa Light | | | |
| Blower | | | |

SWIMMING POOL AND SPA CONTROLLER SYSTEMS AND EQUIPMENT

FIELD OF THE INVENTION

This invention relates to systems and equipment for controlling aspects of recreational environments including, but not limited to, operation and maintenance of swimming pools and spas. The invention additionally relates to simulations of such systems and equipment and, if desired, systems and methods for providing information obtained from the simulators to the controllers themselves.

BACKGROUND OF THE INVENTION

U.S. Pat. No. 5,019,250 to Lorenzen, the contents of which are incorporated herein in their entirety by this reference, describes automatic chemical dispensers for use with swimming pools. The devices are designed to dispense water-sanitization chemicals such as, for example, sodium dichlor granules into water within swimming pools. They additionally include sensors capable of monitoring concentrations of the chemicals in the pool water and signaling controllers accordingly. As noted in the Lorenzen patent, "[w]henever the sensor probe senses a chemical level below a desired level, dispensation of a metered amount of chemical is effected" via the controller. See Lorenzen, col. 7, 11. 8-10 (numeral omitted).

Detailed in U.S. Pat. No. 6,309,538 to Khan are additional automated monitoring and dispensing units for use in spas or other water-containing objects. A unit may comprise a housing developed to float freely within spas as well as "a programmable controller coupled to one or more sensor electrodes for monitoring selected water chemistry parameters at timed intervals." See Khan, col. 2, 11. 52-54.

The controller may be
 in the form of a microcontroller such as a small computer or computer chip powered by [a] battery pack. The controller is coupled to a data entry panel which includes appropriate keys for entering programming information. Specifically, the data entry panel is utilized to enter information such as time of day, spa size in gallons of water, and a schedule for taking water chemistry readings. In addition, the data entry panel may be used to program the target ranges for water chemistry readings together with associated chemical agent dosages to be added to the spa water in response to water chemistry readings, although such information may be pre-programmed into the controller in the form of a "read only" memory.

See id., col. 6, 11. 8-20. The contents of the Khan patent also are incorporated herein in their entirety by reference.

The devices of the Lorenzen and Khan patents are highly beneficial for dispensing chemicals within pools, spas, or similar containers of water. However, they are not immediately adaptable to control numerous other aspects of pool or spa operation and maintenance or other aspects of recreational environments. Consequently, devices capable of controlling some or all of these other aspects would be advantageous. In particular, devices able to control such things as operation of heaters, pumps, filters, lights, and automatic electrical or mechanical pool cleaners (including in-floor cleaning systems) within pools or spas, for example, in addition to chemical dispensers such as those of the Lorenzen and Khan patents, could be useful to owners of the vessels. Likewise, devices adapted to control backyard lighting, yard sprinklers, electrically-operable outdoor cooking equipment, security systems, and home HVAC systems, as further examples, additionally could contribute to improving recreational experiences for those using pools and spas. Integrating these control functions into a single, or small number, of modular units also could be advantageous.

Additionally, neither controller of the Lorenzen and Khan patents is the subject of any simulation. As a result, no opportunity exists to evaluate or manipulate either controller other than through actual use in its intended environment. Similarly, no opportunity exists to feed back to the controllers information obtained as a result of simulating their operation.

SUMMARY OF THE INVENTION

The present invention provides devices capable of controlling aspects of recreational environments beyond those described in the Lorenzen and Khan patents. Any aspect of pool or spa settings or operations may be managed by the current systems, for example. Control of other electronic or electrically-actuatable devices may occur as well, and the current systems also may cooperate or be used in tandem with home automation systems.

Equipment of the invention may connect in any appropriate way to personal or other computers or other components capable of accepting and processing input. Presently-preferred equipment connects, via Ethernet, serial connectivity, wirelessly, or otherwise to the personal computer ("PC") of a user. Users may access the equipment via their PCs, personal data assistants ("PDAs"), the Internet or other networks, or in any other appropriate manner. Software updates and back-ups may be provided to users from remote locations, and information contained in user records may be downloaded remotely, facilitating diagnosing and trouble-shooting of problems users may encounter with their recreational devices.

Controllers of the present invention may be modular in design. Accordingly, different printed circuit boards may be added to or removed from the equipment to perform different control tasks. Alternatively or additionally, complete functionality may be built into the controller and slave functions turned on and off (via software or hardware) as required or desired. Whether through plug-in boards or toggling slave functions, the present controllers may eliminate need for separate units, providing a single unit useful for all intended purposes.

Operations of current systems additionally are capable of being simulated through, preferably, software. The simulations may provide valuable training tools for pool-equipment installers and for end users, simulating functional run sequences of the equipment as well as mimicking (in a virtual sense) actions of remote handheld units, for example. Preferred simulations allow each function to be accessed via a single screen and include interactive audible (or visual) signals (e.g. alarms) responsive to certain functional conditions. Such audible signals preferably match those of the actual control systems, although users conceivably may input different sound files into the simulation software for different alarms (or for when controlling the systems remotely from a PC, for example).

Software useful as part of the simulations may accept and save input data so that a virtual system, once configured, may continue to be available to a user for simulation without repeated reconfiguring. Configuration or other data from the simulation software additionally may be downloaded to systems of the present invention to effect system changes. Conversely, data from the control systems may be uploaded to the simulation software for trouble-shooting, diagnostic, or other purposes.

Moreover, because no physical heating, cooling, or preparation time is necessary for the virtual equipment of the simulator, cycle time for a series of events may be compressed during the simulations. Consequently, differing combinations or variants of series of events may be simulated more rapidly than they could occur in reality. This in turn permits more such combinations or variants to be evaluated by users of the simulations than otherwise could occur in the same time period for real equipment.

It thus is an optional, non-exclusive object of the present invention to provide systems for controlling aspects of recreational environments.

It is an additional optional, non-exclusive object of the present invention to provide systems managing electronic or electrically-actuatable devices, particularly those associated with pools and spas.

It is another optional, non-exclusive object of the present invention to provide systems having equipment capable of connecting to or communicating with, among other items, PCs, PDAs, or other devices that may be remote from the equipment.

It is a further optional, non-exclusive object of the present invention to provide systems in which software updates and back-ups may be provided to users from remote locations and information contained in user records may be downloaded remotely.

It is also an optional, non-exclusive object of the present invention to provide systems in which controllers may be modular in design.

It is, moreover, an optional, non-exclusive object of the present invention to provide systems whose operations may be simulated through, preferably, software.

It is yet another optional, non-exclusive object of the present invention to provide simulations of such systems that may accept and save input data so that a virtual system, once configured, may continue to be available to a user for simulation without repeated reconfiguring.

It is, as well, an optional, non-exclusive object of the present invention to provide simulations of such systems in which data may be downloaded to, or uploaded from, the systems themselves.

Other objects, features, and advantages of the present invention will be apparent to those skilled in the relevant fields with reference to the remaining text and drawings of this application.

DETAILED DESCRIPTION

A. System Hardware

Systems of the present invention may include various printed circuit boards or similar components designed to provide certain functionality. A preferred system includes at least a command center board ("CCB"), an activator board ("AB"), a feeder-control board (denoted the "Watermatic" board), and either or both of wireless and wired remote boards. The CCB functions as the main control board for the system, preferably controlling operation of electrical devices such as (but not necessarily limited to) pumps, valve actuators, heaters, blowers, lights, or other pool, spa, or recreational equipment. Interfacing with a user may be accomplished via a liquid crystal display ("LCD") with light-emitting diode backlighting, although those skilled in the art will recognize that other interfaces between the CCB and users may exist instead. Presently-preferred software navigation by the user occurs via tactile switches which, in at least one embodiment, may be labeled "up," "down, " "left," "right," and "enter."

Any suitable connections may be used between the CCB and other boards of the system. Data logging may be accomplished using an external data logger connected to the CCB via an RS232 serial cable or otherwise, and an external X-10 controller may likewise be connected to the CCB. Types of programmable memory devices may be included on or connected to the CCB, as may an audio device such as a speaker or buzzer.

The AB is designed to incorporate hardware needed for controlled equipment to communicate with the CCB. Examples of hardware present on or connected to the AB may be relays, valve actuators, terminal blocks, and headers. One preferred embodiment of the system includes, on the AB, eight high-power relays, six valve actuators, two removable terminal blocks for connecting up to six normally-open low power devices (such as heaters or landscape lighting), two removable terminal blocks to connect five temperature sensors and one pressure sensor, one removable terminal block for supplying voltage and current, and one Molex nine-pin header used to connect a communication power cable. More or fewer of any of these components may, of course, be present instead.

Chemical feeders may be controlled by the Watermatic board. Input to the Watermatic board typically will be readings of pH and oxidation-reduction potential ("ORP") sensors within a pool, spa, or other body of water. Outputs usually comprise non-zero voltages to the chemical feeders when chemicals are to be introduced or added to the water and zero voltage otherwise.

Chemical feeding may be continuous, be keyed to particular times, or occur upon demand based, for example, on pH or ORP readings. It also may be designed to occur only if sensors indicate the feeders are not empty and have water flowing through them. Connections between the Watermatic board and the sensors and feeders may occur in any suitable manners, and an external alarm may be connected to the board, if desired, to alert users to problems associated with feeding chemicals to their pools or spas.

Optionally included may be a wireless remote board, preferably part of a portable, hand-held device. Such device may include a user interface in the form of an LCD screen and accept input via tactile switches similar to those described earlier. Again, however, other interfaces and inputs may be utilized instead. Communication between the wireless remote board and the CCB may occur directly or indirectly, preferably using an 802.11a Mini PCI Card and a corresponding antenna, and the device may also include an audio device such as a speaker or buzzer. Moreover, because the device beneficially is portable, it may include its own power source such as a battery. Preferably the battery is rechargeable and of lithium-ion chemistry, although other batteries or power sources (including but not limited to solar power) may be utilized as alternatives. If rechargeable batteries are employed, the systems additionally may include battery chargers.

Similarly optionally included as part of the present systems is a wired remote board. This board may function like the wireless remote board but be wired to the CCB. Consequently, no self-contained power source, and no Mini PCI Card, are necessary for the wired remote board.

B. Control Hierarchies

Conflicts between control functions may occur from time to time. As an example, the system may be operating a scheduled pool cleaning when a user wishes to prepare a spa for use. Unless these functions are wholly compatible with system requirements and capabilities, one must have preference over the other.

Consequently, system software is presently adapted to provide seven hierarchies of function (listed in order of preference):
1. Device set-up
2. Service mode
3. Manager rules
4. Freeze protection
5. Manual mode
6. User mode schedule
7. Device schedule The highest preference is provided to "device set-up," as proper configuration may be required for other functions to occur. For example, if the system is set-up as being pool only (i.e. no spa is present to be controlled), switching to a spa-control mode would be impossible.

The second highest preference is provided to "service mode." This mode permits qualified technicians to operate controlled devices manually for trouble-shooting or other purposes. In this mode, certain safety interlocks may be overridden.

"Manager rules" are provided the third highest preference. Such rules specify equipment interlocks for timing and safety purposes and cannot be violated by lower-level control preferences. As one example of this sort of rule, a thirty-second start delay may be mandated for a cleaner pump so as to allow a circulation pump to purge air out of fluid lines to the cleaner pump. Although the manager rules preferably cannot be modified except through software updates, the system may, in certain circumstances, allow the rules to be disabled or adjusted for timing.

The next highest preference is for "freeze protection." In this mode, the system automatically starts and stops particular controlled devices to reduce the risk of water pipes freezing because of low temperatures. Input for freeze-level determinations may be provided by any appropriate temperature-measuring device for air, water, or both air and water.

The fifth highest preference is provided to "manual mode." In this mode, a user attempts to change the status of the system by starting or stopping specific devices or modes. Such attempts may occur at any time at the discretion of the user.

A "user mode schedule" defines groups of two or more devices scheduled to operate in specific states at particular times. In a preferred version of the system, four schedules may be created for each device. As one of many examples, one such schedule may cause operation of a spa spillover together with all lighting to create a "show"-style scene. Systems of the present invention may allow users to name, or otherwise custom-identify, certain schedules, so for this example a user indeed may name the schedule "show" if he or she desires.

Because user mode schedules may conflict, a sub-hierarchy may be created to prefer one schedule over another. Advantageously, the schedule starting later will be preferred. Thus if, for example, a first schedule is created to operate from noon to 5 pm and a second schedule is setup for operation from 3-4 pm, the system will operate the first schedule from noon to 3 pm, switch to the second schedule from 3-4 pm, and return to the first schedule from 4-5 pm.

The lowest hierarchy is reserved for the "device schedule." In this mode, an individual device is scheduled to operate at specific times or at specific intervals. If two or more device schedules conflict, the preferred system handles the conflict in a manner similar to that described in the preceding paragraph.

C. General User Interfaces

Figure 1:
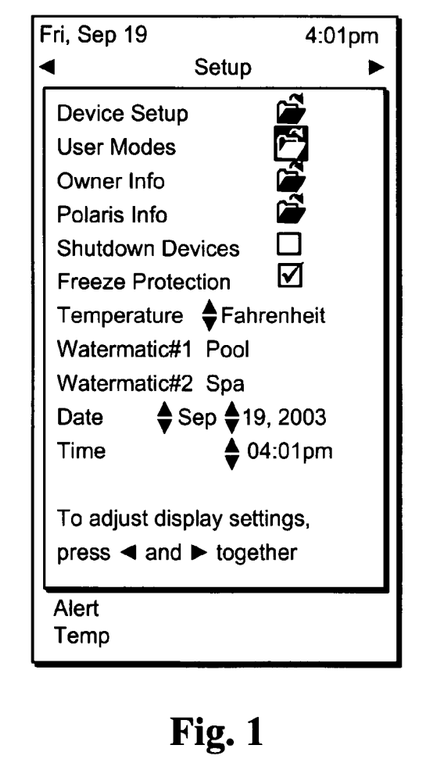
FIG. 1 is a sample screen shot of an LCD display of the system.

As noted earlier, the system may be controlled from any or all of the CCB, the wireless remote board, or the wired remote board (with any of these wirelessly connected or wired to PCs, PDAs, or otherwise as desired). Illustrated in FIG. 1 is a sample screen shot of an LCD display of the system. In this sample, the screen displays date, time, and mode information at its top and may display temperature and alert (warning) information at its bottom. The intermediate portion of the screen is designed to display information about modes and devices controllable by the user.

As shown in FIG. 1, the system is in a setup mode in which various setup functions may be displayed. This setup menu also may include a list of sub-menus. Via the sub-menus, a user may access and change device and user information.

Figure 2:
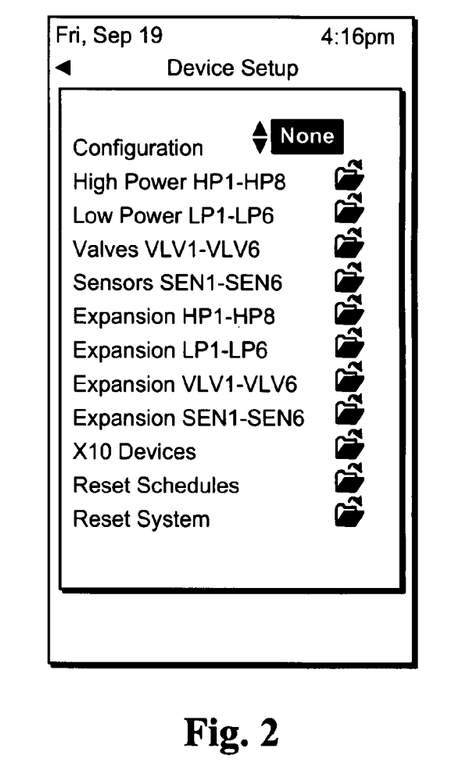
FIG. 2 provides a sample screen shot of setup sub-menus.

FIG. 2 provides a sample screen shot of setup sub-menus. The initial sub-menu, denoted "Configuration," may be used to prepare remaining sub-menus with appropriate device identifications specific to a user's situation. Sample initial choices for a user may include whether he or she operates (1) no pool or spa, (2) separate pool and spa, (3) only a pool, (4) only a spa, or (5) combined pool and spa.

Figure 3:
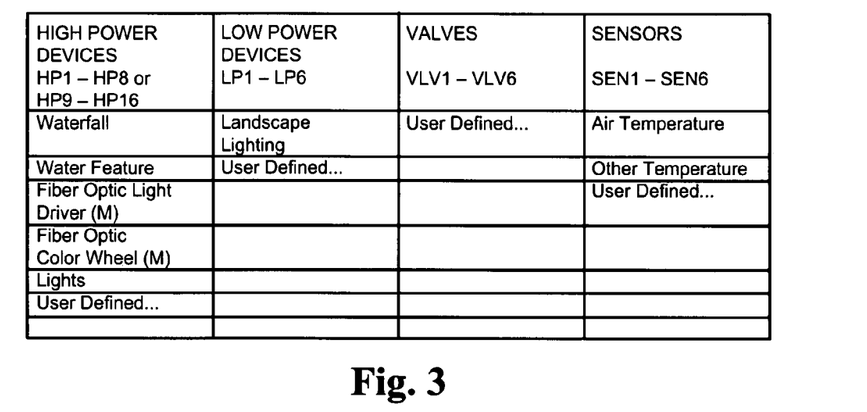
FIG. 3 is a table indicating sub-menus preferably available when no pool or spa is to be controlled by the system.
Figure 4:
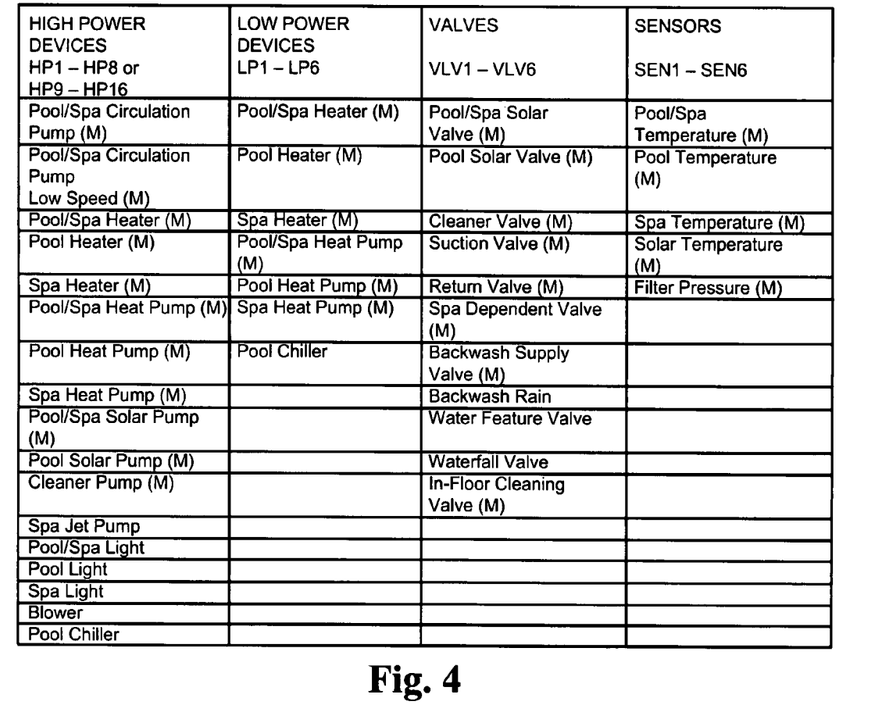
FIG. 4 provides a table of sub-menus preferably available when a combined pool and spa is to be controlled by the system.
Figure 5:
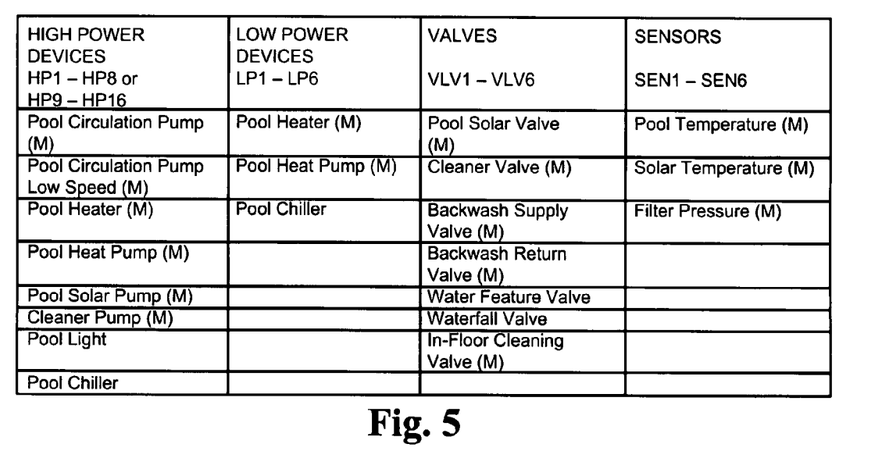
FIG. 5 is a table of sub-menus preferably presented when only a pool (i.e. no spa) is to be controlled by the system.
Figure 6:
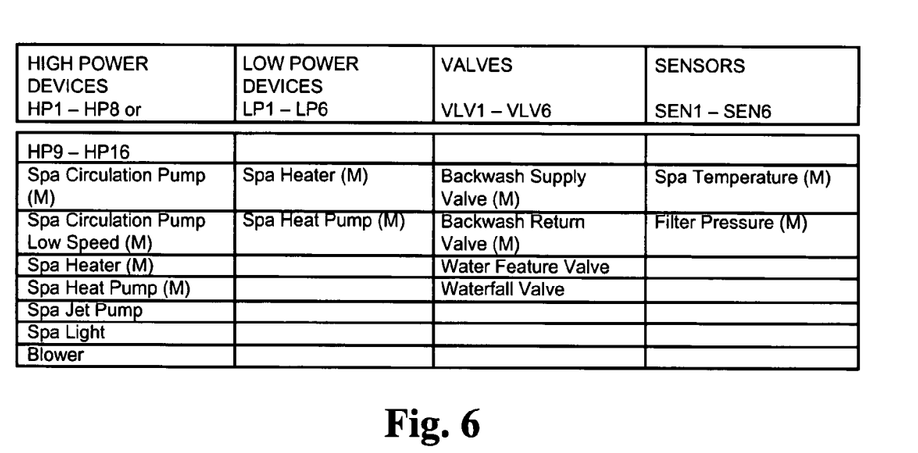
FIG. 6 is a table of sub-menus preferably present when only a spa (i.e. no pool) is to be controlled by the system.
Figure 7:
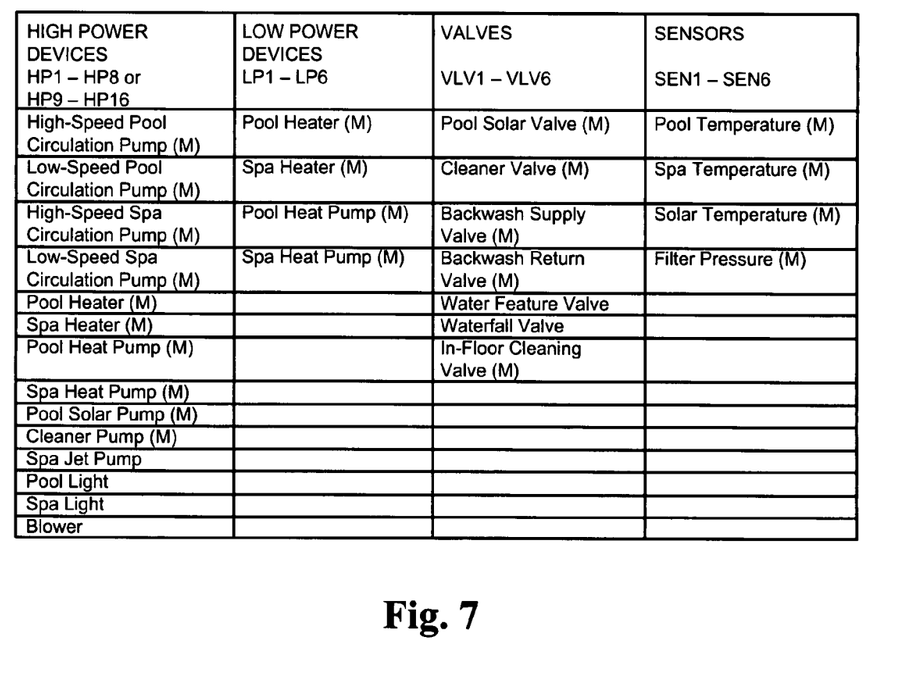
FIG. 7 is a table of sub-menus preferably available for controlling a separate pool and spa.

Depending on the user's response to the initial configuration query, additional sub-menus may be made available. FIG. 3 is a table indicating sub-menus available when no pool or spa is to be controlled by the system, whereas FIG. 4 provides a table of sub-menus available when a combined pool and spa is to be controlled. FIG. 5 is a table of sub-menus presented when only a pool is to be controlled, FIG. 6 is a table of sub-menus present when only a spa is to be controlled, and FIG. 7 is a table of sub-menus available for controlling separate pools and spas.

Figure 8:
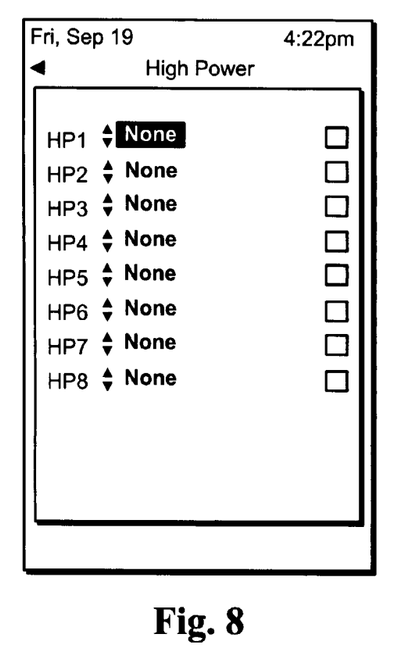
FIG. 8 is a sample setup sub-menu screen for high-power or low-power devices (such as, for example, valve actuators or salt screens).

FIG. 8 illustrates a sample setup sub-menu screen for high-power devices. For each number appearing in the left column of the display, a user may enter an associated device name and, in the right column, indicate whether the associated device is to be operational in service mode. Similar submenus may be used for equipment such as low-power devices, valves, and sensors. Devices adapted to communicate using X-10 protocols may be controlled by an external X-10 controller in cooperation with the CCB. Such devices, if lighting, may be configured in the sub-menus as either dimmable or non-dimmable.

As part of the setup, a user additionally may input personal information including, for example, his or her name and address, the serial number assigned to the system hardware, and information concerning the servicer for the system. This information may be useful for identification should information need to be uploaded or downloaded to a system or when servicing is required. Password protection may be provided as well for the system.

D. Main Menu

Figure 9:
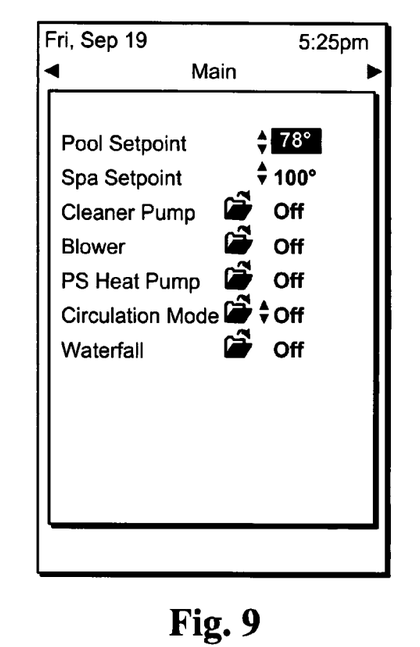
FIG. 9 is an exemplary main menu for the system.

Depicted in FIG. 9 is an exemplary main menu for the system. Such menu preferably appears immediately following successful entry of a user's password (assuming password protection is operational). From the main menu, the user may view and manually change the operational state of devices and may set device schedules.

E. Watermatic Menu

Figure 10:
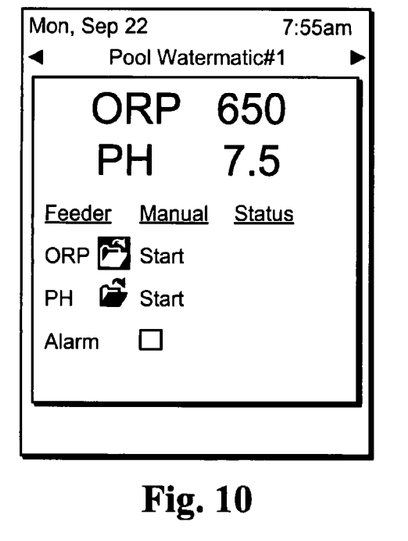
FIG. 10 is a sample menu displaying ORP and pH values for water contained in a pool or spa.

Chemicals dispensers such as (but not limited to) those of the Lorenzen patent may be controlled by the system. Information concerning ORP and pH values for water contained in a pool or spa may be communicated to the Watermatic board or CCB from one or more of the dispensers and displayed, for example, in the format shown in FIG. 10 (with ORP values shown in millivolts). From the Watermatic menu a user may, if desired, manually initiate automatic dispensing of chemicals to affect the ORP, pH, or both of the relevant water.

Figure 11:
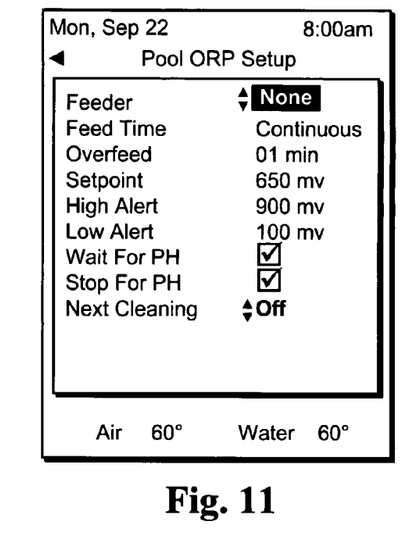
FIG. 11 illustrates a sample ORP setup sub-menu of the Watermatic menu.

FIG. 11 illustrates an ORP setup sub-menu of the Watermatic menu. Included among inputs optionally expected from the user are (1) the type of feeder to be controlled (e.g. granular, liquid, low- or high-power erosion, or motorized ball valve), (2) whether the dispensing is available to occur continuously, on a schedule, or upon demand (3) the length of time, during continuous feeding operations, before which the ORP of the water must reach a set point to avoid feeder shut-down, (4) maximum and minimum ORPs above and below which alarms will be activated, (5) whether feeding to affect pH is to have priority over feeding to impact ORP, and (6) whether a reminder should be provided to the user to clean associated sensors.

Figure 12:
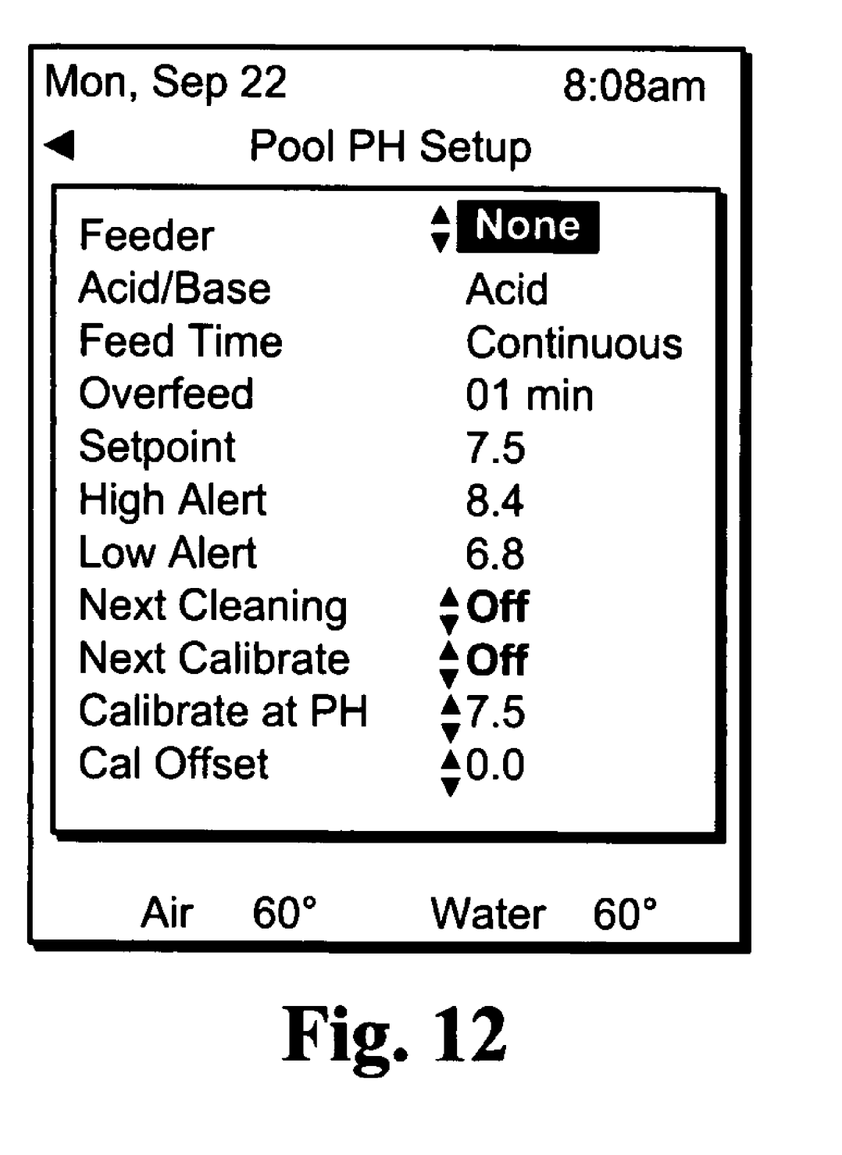
FIG. 12 is an exemplary pH setup sub-menu of the Watermatic menu.

Analogous control choices may be made via the pH setup sub-menu depicted in FIG. 12. Solicited on this sub-menu is information such as (1) the type of feeder to be controlled, (2) a pH set point, (3) whether pH is to be maintained on either the acidic or basic side of a set point, (4) whether the dispensing is available to occur continuously, on a schedule, or upon demand, (5) the length of time, during continuous feeding operations, before which the pH of the water must reach a set point to avoid feeder shut-down, (6) maximum and minimum pH values above and below which alarms will be activated, and (7) whether a reminder should be provided to the user to clean or calibrate associated sensors. Via this sub-menu a user also may calibrate the displayed pH reading to match that of a test kit.

F. Manager Rules

For performance, safety, or other considerations, operational rules may be created and implemented using the present system. As examples, water-circulation pumps may be required by rule to operate for periods of time prior to activation of water heaters, heater pumps, solar pumps, or cleaner pumps and after termination of activation of heaters or heater pumps. As another example, if multiple heating sources are available, rules may be created as to when each source is used in preference to the others.

G. Manual Mode

If manual mode is initiated when the system is not operating, the system checks manager rules to ensure none would be violated by the initiation. For example, if a user attempts manually to commence operation of a cleaner pump when the system is not already functioning, by rule such commencement will be delayed until the recirculation pump is started and running for a predetermined period of time. Preferably, manual mode functions only for a limited time (e.g. two hours, four hours, etc.) before the system either returns to its previous mode or changes to a default mode.

H. Simulation

By modeling equipment action and water and other environmental characteristics under various conditions, software of the system additionally may be used to simulate performance of controllable devices. As noted earlier, software useful as part of the simulations may accept and save input data so that a virtual system, once configured, may continue to be available to a user for simulation without repeated reconfiguring. Further, the modeling may permit cycle times for series of events to be compressed for purposes of the simulations. The simulations may be executed by actual or prospective builders, installers, or users of recreational equipment. Access to the simulation software may be provided via the Internet, portable storage devices (such as but not limited to compact discs, memory sticks, etc.), or otherwise.

I. Additional Features

Systems of the invention provide integrated, modular platforms for controlling multiple recreational components. Some or all of the basic system hardware may be included within a waterproof box or other container, with such container additionally including wired slots adapted to receive additional or updated printed circuit boards if desired. Systems may provide functionality relating to servicing and diagnosing problems in equipment, may incorporate touch-screen technology in addition to or instead of tactile switches, and may utilize either color or black-and-white displays. Via the modular design, moreover, the amount of container space needed to house basic system hardware may be diminished. In addition to sensors described above, sensors of the system also may indicate presence of debris on pool floors (so as to activate in-floor or other automatic pool cleaners) or persons in the water without permission (so as to activate drowning-avoidance alarms). Sensors may, as well, measure such things as calcium hardness, water levels, and fluid-flow through sand filters for input to the CCB and subsequent activation of equipment able to effect changes in the measurements when appropriate and may sense information about wind or rain for input to in-floor cleaning systems.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A system for controlling aspects of a recreational environment including a water-containing vessel and associated pipes, the system comprising:

a. first means for accepting control input from a user, such control input comprising a permitted range of values of at least one of pH or oxidation reduction potential (ORP) of water contained in the vessel;

b. means for controlling, based at least in part on the accepted control input, equipment (i) remote from the first accepting means and (ii) configured to affect one or more characteristics of water contained in the vessel, the equipment comprising at least one chemical dispensers, at least one automatic pool cleaner or in-floor pool cleaner, and at least one heater or pump;

c. a first sensor adapted to measure a first value of pH or oxidation-reduction potential of water contained in the vessel; and d. a second sensor adapted to measure a second value of temperature of the water contained in the vessel or temperature of ambient air adjacent water contained in the vessel; and in which the control means comprises:
   (i) means for (A) comparing the first value to the control input and (B) activating the chemical dispenser when the first value is not within the permitted range of values;
   (ii) means for (A) comparing the second value to a third value and B activating at least one of the heater or pump if the comparison of the second value to the third value indicates water in the pipes is subject to freezing; and
   (iii) means for assigning a hierarchy to control input such that control input cannot preempt comparison of the second value to the third value while the system is operational.

2. A system according to claim 1 in which the means for activating the chemical dispenser deactivates the dispenser when chemicals are not present in the dispenser, water is not flowing through the dispenser, or both.

3. A system according to claim 1 in which the first means for accepting control input is configured to accept control input directing the chemical dispenser to dispense chemicals in each of the following manners: (a) continuously, (b) keyed to particular times, and (c) upon demand.

4. A system according to claim 3 in which the means for activating the chemical dispenser deactivates the dispenser when chemicals are not present in the dispenser, water is not flowing through the dispenser, or both.

5. A system according to claim 4 in which (i) the first sensor is adapted to measure the first value repeatedly as a function of time and (ii) if the control input directs the chemical dispenser to dispense chemicals continuously, the means for activating the chemical dispenser deactivates the dispenser if the first value does not equal a set point after a predetermined period of time.

6. A system according to claim 3 in which (i) the first sensor is adapted to measure the first value repeatedly as a function of time and (ii) if the control input directs the chemical dispenser to dispense chemicals continuously, the means for activating the chemical dispenser deactivates the dispenser if the first value does not equal a set point after a predetermined period of time.

* * * * *